J. C. & S. CHAMBERS.
Force-Pumps.
No. 158,030. Patented Dec. 22, 1874.
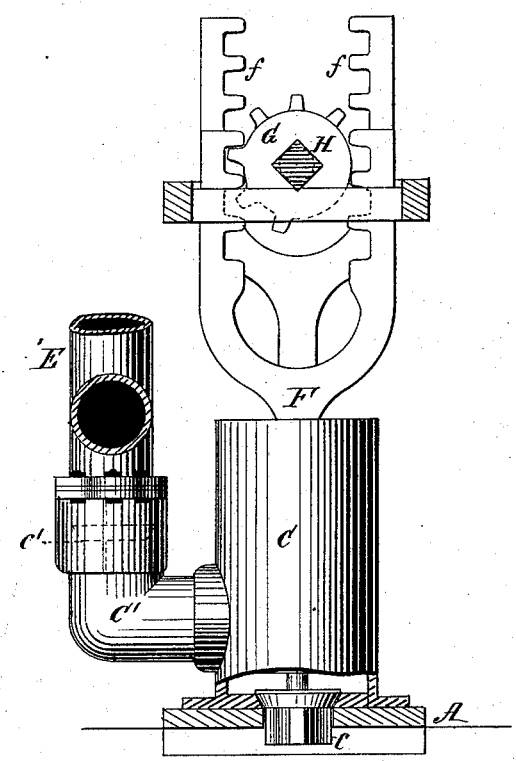
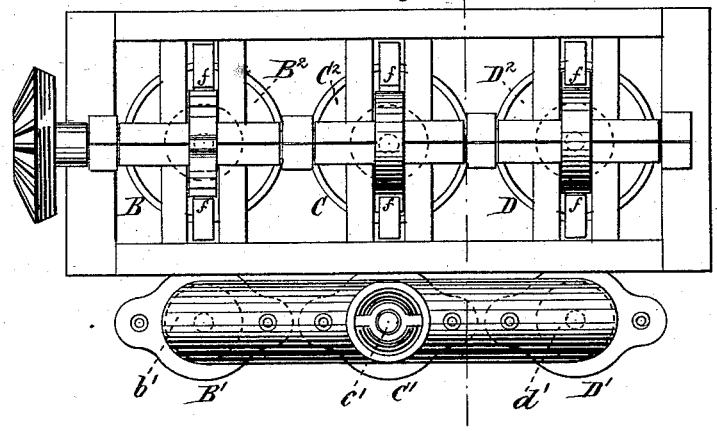
WITNESSES:
G. Mathys
Colon C. Nemon
INVENTOR:
J. C. Chambers
Silas Chambers
BY
ATTORNEYS.

UNITED STATES PATENT OFFICE.

JOB C. CHAMBERS AND SILAS CHAMBERS, OF DALLAS, TEXAS.

IMPROVEMENT IN FORCE-PUMPS.

Specification forming part of Letters Patent No. 158,030, dated December 22, 1874; application filed November 16, 1874.

*To all whom it may concern:*

Be it known that we, JOB C. CHAMBERS and SILAS CHAMBERS, of Dallas, Dallas county, in the State of Texas, have invented a new and Improved Pump; and we do hereby declare that the following is a full, clear, and exact description of the same, reference being had to the accompanying drawings, forming a part of this specification, in which—

Figure 1 is a side elevation; Fig. 2, a plan view.

The invention will first be fully described, and then pointed out in the claim.

A represents the base, upon which are secured in a row three cylinders, B C D. Each of these is connected by a bottom inlet-valve, $c$, with the water-pipe, and by pipes $B^1$ $C^1$ $D^1$, having each an outlet-valve, $b'$ $c'$ $d'$, with the discharge-pipe E. $B^2$ $C^2$ $D^2$ are the operating-pistons, having each a bifurcated shank, F, whose arms are racked on their opposite faces $f$. In these racks mesh the pinions G G G, all arranged upon the same rotary shaft H, and each toothed on one-third of the circumference, and so relatively placed upon the shaft H that, viewed from the side, the three pinion-sections would just form a full toothed pinion. Thus one or two will always be forcing water into the outlet-pipe E, producing a copious and continuous flow.

We are aware that it is not new to reciprocate a bar by a single pinion acting alternately upon the opposite racks of its arms; but

What we claim is—

The combination, with discharge-pipe E, three valved connected pipes, $B^1$ $C^1$ $D^1$, and three bottom-valved cylinders, B C D, of the three pistons $B^2$ $C^2$ $D^2$, one or two of which is always forcing water into the discharge-pipe, as set forth.

The above specification of our invention signed by us.

J. C. CHAMBERS.
    SILAS CHAMBERS.

Witnesses to the signature of JOB C. CHAMBERS:
  SOLON C. KEMON,
  CHAS. A. PETTIT.

Witnesses to the signature of SILAS CHAMBERS:
  WM. A. LYTE,
  J. WOODSON.